(12) United States Patent
Buvid et al.

(10) Patent No.: US 10,167,854 B2
(45) Date of Patent: Jan. 1, 2019

(54) SHAPE MEMORY ARTICLE WITH HEAT-GENERATING MICROCAPSULE

(71) Applicant: International Business Machines Corporation, Armonk, NY (US)

(72) Inventors: Daniel J. Buvid, Rochester, MN (US); Eric J. Campbell, Rochester, MN (US); Sarah K. Czaplewski, Rochester, MN (US); Christopher W. Steffen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 15/222,312

(22) Filed: Jul. 28, 2016

(65) Prior Publication Data

US 2018/0030965 A1 Feb. 1, 2018

(51) Int. Cl.
*F03G 7/06* (2006.01)
*H01H 51/22* (2006.01)
*B29C 47/00* (2006.01)

(52) U.S. Cl.
CPC .............. *F03G 7/065* (2013.01); *B29C 47/00* (2013.01); *F03G 7/06* (2013.01); *H01H 51/22* (2013.01)

(58) Field of Classification Search
CPC ........ H01H 51/22; B32B 27/08; B29C 47/00; B29C 47/06; F03G 7/06
See application file for complete search history.

(56) References Cited

U.S. PATENT DOCUMENTS

| 7,372,348 | B2 | 5/2008 | Xu et al. |
| 9,180,632 | B2 | 11/2015 | Hemmelgarn et al. |
| 2013/0034736 | A1 | 2/2013 | Gossi et al. |
| 2015/0073476 | A1 | 3/2015 | Brown et al. |
| 2015/0093559 | A1 | 4/2015 | Baer et al. |

FOREIGN PATENT DOCUMENTS

WO 9810190 A1 3/1998

OTHER PUBLICATIONS

Harper Meng et al., A review of stimuli-responsive shape memory polymer composites, Polymer 54, 2013, pp. 2199-2221.
Jaronie Mohd Jani et al., A review of shape memory alloy research, applications and opportunities, Materials and Design 56, 2014, pp. 1078-1113.
U.S. Appl. No. 14/937,983, filed Nov. 11, 2015.

*Primary Examiner* — Aileen B Felton
(74) *Attorney, Agent, or Firm* — Patterson + Sheridan, LLP

(57) ABSTRACT

A shape memory article comprises a shape memory material that transitions to a first shape from a second shape when a temperature of the shape memory material exceeds a threshold temperature. A plurality of microcapsules is in thermal contact with the shape memory material. Each microcapsule in the plurality of microcapsules has a first compartment, a second compartment, and an isolating structure separating the first and second compartments. The isolating structure is rupturable in response to a stimulus. The first compartments each contain a first component, and the second compartments each contain a second component that reacts with the first component to produce heat.

20 Claims, 3 Drawing Sheets

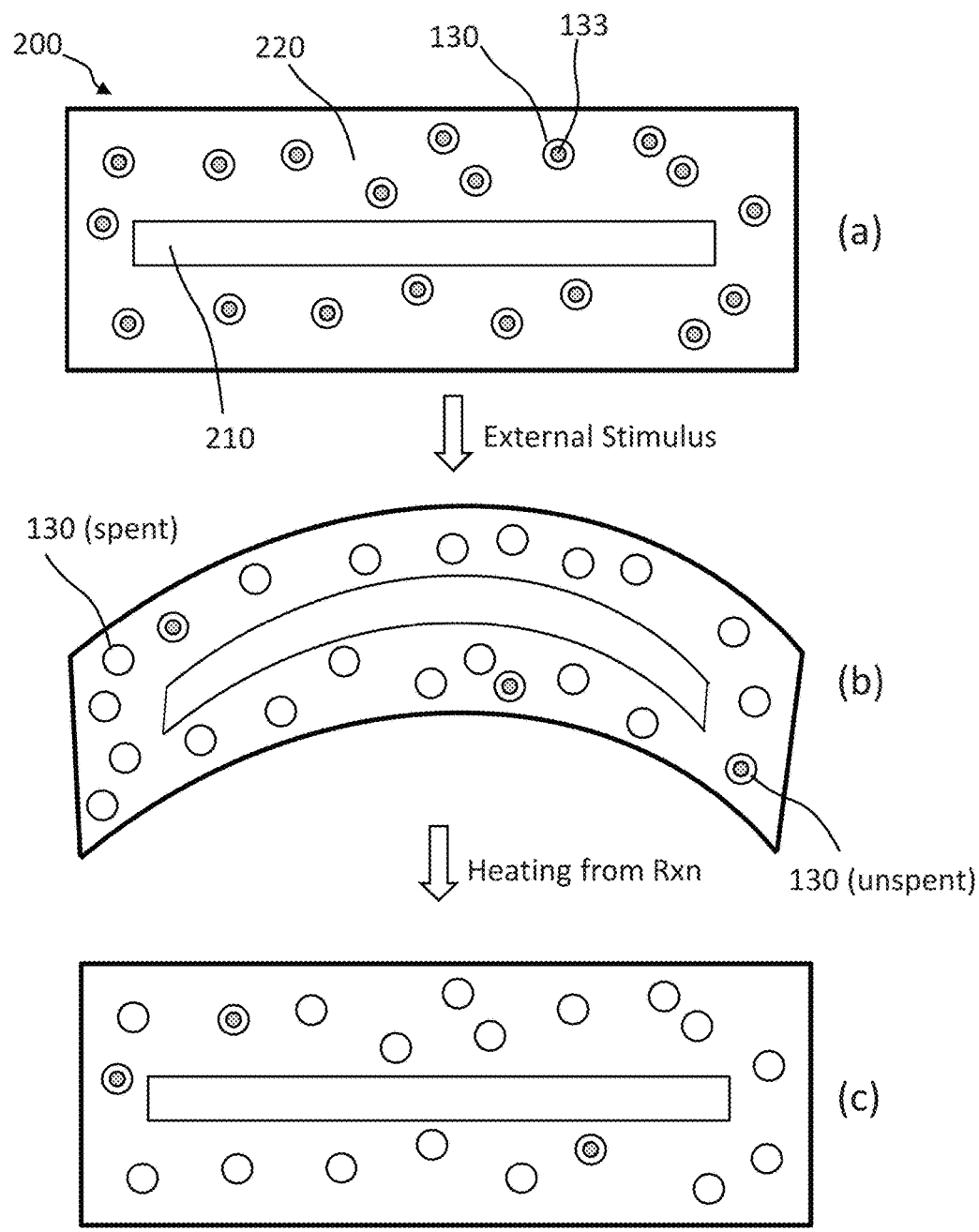

SHAPE MEMORY ARTICLE WITH HEAT-GENERATING MICROCAPSULE

BACKGROUND

The present disclosure concerns shape memory materials and shape memory articles incorporating microcapsules that generate heat when subjected to a stimulus.

Stimulus-responsive materials change properties, such as shape or electrical conductivity, in response to changes in external conditions, such as application of an electromagnetic field or temperature changes. A stimulus-responsive material that reverts to an original shape from a different shape is known as a shape memory material (SMM). Many SMMs that are triggered by a temperature change are known. However, the heat required to induce a shape reversion in components formed of these SMMs is provided externally, which limits the utility and potential applications of these materials and components formed of these materials.

SUMMARY

According to one embodiment, a shape memory article comprises a shape memory material that transitions to a first shape from a second shape when a temperature of the shape memory material exceeds a threshold temperature. A plurality of microcapsules is in thermal contact with the shape memory material. Each microcapsule in the plurality of microcapsules has a first compartment, a second compartment, and an isolating structure separating the first and second compartments. The isolating structure is rupturable in response to a stimulus. The first compartments each contain a first component. The second compartments each contain a second component that reacts with the first component to produce heat.

According to another embodiment, a shape memory material comprises a matrix material that transitions to a first shape from a second shape when a temperature of the matrix material exceeds a threshold temperature. A microcapsule is in the matrix material. The microcapsule has a first compartment, a second compartment, and an isolating structure separating the first and second compartments. The isolating structure is rupturable in response to a stimulus. The first compartment contains a first component, and the second compartment contains a second component. The second component reacts with the first component to produce heat.

According to still another embodiment, a shape memory article comprises a shape memory material that transitions to a first shape from a second shape when a temperature of the shape memory material exceeds a threshold temperature. A coating is provided on at least a portion of the shape memory material. A microcapsule is in the coating. The microcapsule has a first compartment, a second compartment, and an isolating structure separating the first and second compartments. The isolating structure is rupturable in response to a stimulus. The first compartment contains a first component, and the second compartment contains a second component that reacts with the first component to produce heat.

BRIEF DESCRIPTION OF THE DRAWINGS

FIG. 2 depicts a shape memory component incorporating heat-generating microcapsules and undergoing a stimulus-triggered reversion process according to a second embodiment.

DETAILED DESCRIPTION

Figure 1:
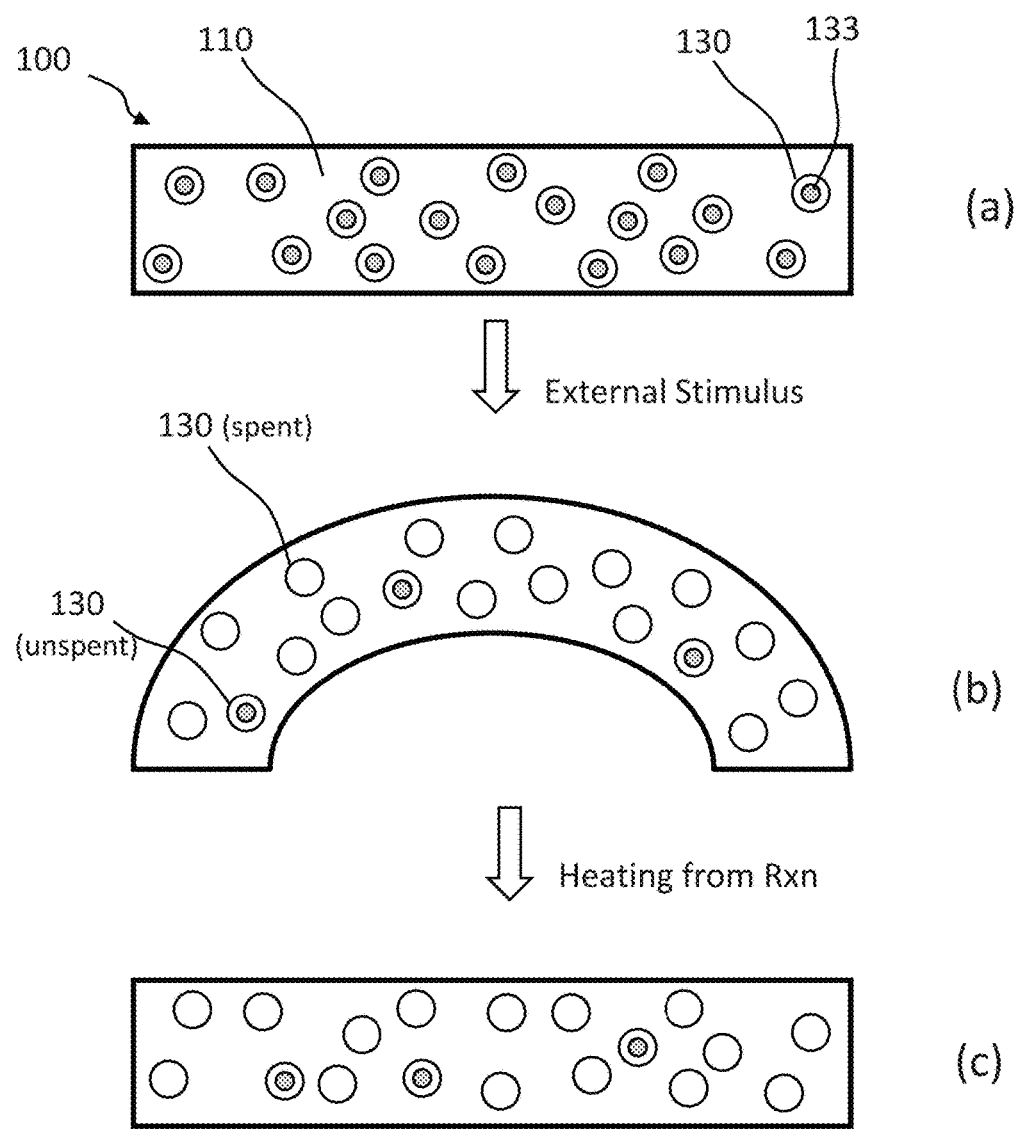
FIG. 1 depicts a shape memory component incorporating heat-generating microcapsules and undergoing a stimulus-triggered reversion process according to a first embodiment.

A shape memory material (SMM), or an article or component including such a material, may revert to an original shape from a distorted/altered shape in response to a stimulus, such as change in magnetic field strength or a change in temperature. For example, with a temperature-trigged SMM, the material reverts to the original shape when a temperature exceeds some threshold level. The heat required for the triggering temperature change would generally be supplied from outside the SMM. For example, the SMM might be placed in an oven or exposed to a heat lamp so as to heat the material above its reversion threshold temperature. However, such external heating might not always be readily available or easily applied in all instances.

Multi-compartment microcapsules that can generate heat in response to various stimuli have been developed. Multi-compartment microcapsules can be formed in a variety of structural configurations (e.g., concentric, pericentric, inner-centric, or acentric). Multi-compartment microcapsules include at least two compartments that are separated from each other by a barrier. These compartments may contain various chemical compounds. The compounds can be selected to spontaneously react with each other when placed in contact. In a particular example, the barrier between compartments can be designed to rupture (or otherwise degrade in manner allowing components for different compartments to mix) in response to the application of physical force. The stimuli-responsive multi-compartment microcapsules may be produced using a variety of techniques.

A shape memory material in an example for use in a shape memory component or the like can comprise a matrix material that transitions or reverts to a first shape (which may be referred to as an original or permanent shape) from a second shape (which may be referred to as a temporary fixed shape, a distorted shape, a disfigured shape, or the like) when the temperature of the matrix material is increased to above a threshold reversion temperature. Here, the shape memory material of this example includes microcapsules within the matrix material. The microcapsules are multi-compartment type microcapsules with the different compartments formed by internal barriers (shells, membranes, or the like) within the microcapsules. Here, the microcapsules of this example have a first compartment containing a first reactive component and a second compartment containing a second reactive component. The internal barrier is configured to rupture with compressive forces applied to the matrix material. The reactive components react exothermically when placed in contact with each other. While it is required that the internal barrier ruptures or otherwise degrades in a manner allowing the reactive components to mix, it is not required that outer shell of the microcapsule similarly ruptures, though it may do so in response to the same compressive force that ruptures the inner barrier or upon reaction of the reactive components. The heat from the reaction permitted by rupture of the internal barrier is such that the temperature of the matrix material rises and exceeds the threshold reversion temperature, which causes the matrix material to revert to its original shape.

In another example, a shape memory component or article is formed of a shape memory material that transitions to a first shape (original/initial shape) from a second shape (temporary/distorted shape) when a temperature of the shape memory material exceeds a reversion threshold temperature. In this example, the microcapsules used to generate heat in response to a compressive stimulus are incorporated in a coating provided on at least some portion of the shape memory material rather than directly within a shape memory material.

In some examples, different compartments of a multi-compartment microcapsule may hold different materials (reactants) which react exothermically when mixed with each other. The internal barrier separating these different compartments may be ruptured or degraded by an external force, such as compression or shear stress, applied to the microcapsules. That is, while the reactants are separated from each other in the microcapsule by an intact internal barrier, no mixing occurs. But, when the internal barrier is broken (or otherwise degraded to such an extent that components from different compartments can mix) by external forces or conditions, the reactants react and generate heat, which increases the temperature of the surroundings of the microcapsule, which in turn can cause a reversion of temperature-triggered shape memory material (also referred to as a thermo-responsive shape memory material).

FIG. 1 depicts a shape memory article incorporating heat-generating microcapsules and undergoing a stimulus-triggered reversion process according to a first embodiment. The shape memory article 100 is depicted in a first state (a). The shape memory article 100 is comprised of a shape memory material 110 (matrix material). Here, many microcapsules 130 are in the shape memory material 110 and they are depicted as randomly distributed within the shape memory material 110. Internal aspects and fabrication of microcapsules 130 will be discussed; however, for this example, the microcapsules 130 are multi-compartment microcapsules including at least two reactants separated from each other by an inner barrier 133 (or, alternatively, an inner barrier 137, see FIG. 3B). The inner barrier 133 is designed to rupture or degrade in response to an external stimulus. The two reactants are selected to react exothermically when allowed to come into contact with each other. For example, one of the components may be an oxidizable metal and the other component an oxidizer.

In the first state (a), the shape memory article 100 has a first shape and the shape memory material 110 is at a first temperature. In this state, the depicted microcapsules 130 have an intact inner barrier 133, though it is not a requirement that each and every microcapsule 130 have an intact inner barrier in this state.

A stimulus is applied that causes the shape memory article 100 to enter a second state (b). In the second state (b), the shape memory article 100 no longer has the first shape, but has acquired (or adopted) a second shape that is different from the first shape. The temperature of the shape memory material 110 in the second state (b) may be greater than or equal to the first temperature, but is presently less than a second temperature corresponding to a reversion temperature threshold of the shape memory material 110.

The stimulus may be, for example, a physical force applied to the shape memory material 110 that bends or distorts the shape memory material 110 into the second shape. Other stimulus types may be adopted depending on the nature of inner barrier 133. For example, the inner barrier 133 may be rupturable by application of a magnetic field or in response to a temperature increases, whether such temperature increase is resulting from a reaction of microcapsule 130 components or external application of heat. In any event, the stimulus ruptures the inner barrier 133 in at least some portion of the microcapsules 130. In state (b), microcapsules with a ruptured inner barrier 133 may be referred to as spent and those microcapsules 130 with an intact inner barrier may be referred to as unspent.

The rupture/degradation of inner barriers 133 in microcapsules 130 during the transition from first state (a) to second state (b) allows the reactants in at least some microcapsules 130 to mix and react (and generate heat). The heat evolved from stimulated microcapsules 130 (or reactions otherwise associated with the rupturing of inner barriers 133) raises the temperature of the shape memory material 110 to the second temperature (reversion temperature threshold) or a greater temperature.

Once the shape memory material 110 exceeds the second temperature, the shape memory article 100 obtains a third state (c). In the third state, the shape memory article 100 has a third shape, which corresponds to the first shape in this example. The third shape may be substantially identical to the first shape as depicted in FIG. 1, but the third shape may also be distinct from the first and second shapes in some manner and it is not necessary for the first and third shapes to be identical. But as an example, the shape memory article 100 may be a structural member or a protective covering on a structural member such that when an external force bends, dents, or otherwise deforms the shape memory article (or a portion thereof), the resulting rupture of the microcapsules 130 within the shape memory article 100 cause the return to an original shape or condition.

Shape memory material 110 can be a polymer, polymer composite, ceramic, or other material having shape memory characteristics in which microcapsules 130 can be dispersed or otherwise incorporated. The shape memory material 110 may also include fibers (e.g., carbon fibers), fillers (clays, ceramics, beads, etc.), colorants, particulates, and nanomaterials (e.g., carbon nanotubes) without limitation. Shape memory material 110 can comprise a physical blend of different polymers or polymeric phases. Shape memory material 110 can comprise layers of different materials laminated one on the other.

In general, when the shape memory material 110 is a polymeric material, a stable polymer network and a reversible switching transition is required to provide a shape memory effect. The stable polymer network provides the "original" shape of the shape memory material 110, while the reversible switching transition changes the shape memory material 110 into a temporary "fixed" shape from which some triggering event (e.g. heating above a threshold temperature) causes a reversion back the "original" shape. In some cases, the reversible switching transition itself may be the triggering event. For example, the microcapsules may be configured such that deformation of the shape memory material from its original shape causes the microcapsules to rupture, triggering temperature rise and reversion force within the material. Such configurations may be used to prevent excessive deformation of the shape memory material from its original shape. Examples of possible polymeric materials include, without limitation, polynorbornene, polyurethane, polystyrene, epoxy resins, and derivatives thereof. Shape memory polymeric materials are also commercially available in various forms.

FIG. 2 depicts a shape memory article incorporating heat-generating microcapsules and undergoing a heat-triggered reversion process according to a second embodiment. The shape memory article 200 is depicted in a first state (a).

In the first state (a) coating material 220 is disposed on at least a portion of a shape memory material 210. Microcapsules 130 are disposed in the coating material 220 and, in this example, are homogenously distributed in the coating material 220, but this is not specifically required. The microcapsules 130 are otherwise substantially similar in the first and second embodiments.

In the first state (a), the shape memory article 200 has a first shape and is at a first temperature. The depicted microcapsules 130 have an intact inner barrier 133, though in actuality a portion of the microcapsules may already be ruptured or spent. An external stimulus is applied to cause the shape memory article 200 to enter a second state (b). In the second state (b), the shape memory article 200 no longer has the first shape, but has acquired (or adopted) a second shape different from the first shape. The temperature of the shape memory article 200 (more particularly the shape memory material 210) in the second state (b) may be greater than or equal to the first temperature, but is less than a second temperature corresponding to a reversion temperature threshold of the shape memory material 210.

The stimulus may be, for example, a physical force applied to the shape memory article 200 that bends or distorts the shape memory material 210. Again other stimulus types may be adopted depending on the nature of inner barrier 133. For example, the inner barrier 133 may be rupturable by application of a magnetic field or in response to a temperature increases, whether resulting from reaction of microcapsule 130 components or external application of heat.

As in the first embodiment, the rupture/degradation of inner barriers 133 in microcapsules 130 in the transition from first state (a) to second state (b) allows the reactants to mix and react (and generate heat). The heat evolved from the reactions associated with the rupturing of inner barriers 133 raises the temperature of the coating 220, which in turn raises the temperature of shape memory material 210. Once the shape memory material 210 exceeds the second temperature (reversion threshold temperature), a third state (c) is obtained. In the third state, the shape memory article 200 has a third shape, which corresponds to the first shape. The third shape may be substantially identical to the first shape as depicted in FIG. 2, but the third shape might also be distinct from the first and second shapes in some manner and it is not necessary for the first and third shapes to be identical.

In this second embodiment, shape memory material 210 can be any metal alloy, polymer, polymer composite, ceramic, or other material having shape memory characteristics in which microcapsules 130 can be dispersed or on which microcapsules 130 can be coated on using a coating material 220. When the shape memory material 210 is a polymer, polymer composite, or ceramic it may correspond, in general, to the above description of shape memory material 110. When the shape memory material 210 is a metal alloy, then, without limitation, the alloy may be a copper-aluminum-nickel alloy, a nickel-titanium alloy, or other shape memory metal and transition from different states according to crystal structures and/or solid-phase transitions.

Coating 220 may be, for example, any polymeric or resin material in which microcapsules 130 can be incorporated. In some examples, coating 220 may be applied to the shape memory material 210 as a liquid precursor which hardens with heat, light, or chemical reaction after application. The thickness of coating 220 on shape memory material 210 is not particularly limited, and the depiction in FIG. 2 is schematic and not intended to the be to scale. The thickness of coating 220 may vary and need not be uniformly applied on the shape memory material 210. Likewise, the specific loadings/concentrations of microcapsules 130 is not a particularly limited, though it is necessary for the amount to be sufficient to raise the temperature of the shape memory material 210 above the reversion threshold in response to the applied or expected stimulus, but high concentrations of microcapsules 130 may reduce coating quality of the coating 220. Additional layers or materials may be interposed between coating 220 and shape memory material 210, for example, to improve adhesion between coating 220 and shape memory material 210. Likewise, additional layers or materials may be disposed over coating 220, for example, to protect coating 220 from abrasion, light, humidity, chemicals, or the like.

Example Applications

In some embodiments, a variety of heat generating microcapsules 130 can be designed to rupture at various stress-levels and, thereby, the response of the shape memory material or component can be tailored to different applications.

One possible application would involve tailoring the microcapsules 130 to rupture above the yield stress of specific shape memory alloy materials, such that when deformation of these materials occurs, heat would be generated to trigger a shape transition and restore the material back to its original shape thus eliminating or reducing the deformation.

Another application would provide the stress-triggered shape memory materials/components as gaskets to create a tighter gasket seal once the gasket material was compressed on initial tightening. Here, an initial compression of the gasket material would tend to cause deformation of the gasket material, but the stress-triggered rupture of microcapsules 130 would generate heat that would tend to cause the reversion of the gasket material to its initial, un-deformed/un-compressed state. While depending on the applied force to the gasket material, the gasket material might or might not be able to fully revert to an original shape, the gasket material would apply an additional force against the surrounding fittings that could provide a tighter seal than a standard, non-memory material. Thus, in some embodiments, shape memory material 110 may be gasket-shaped and likewise shape memory material 210 may be gasket-shaped. In this context, gasket-shaped includes having a shape adopted for the provision of a sealed connection between two different fittings, mated components, or connecting components.

Example Microcapsules

Figure 3A:
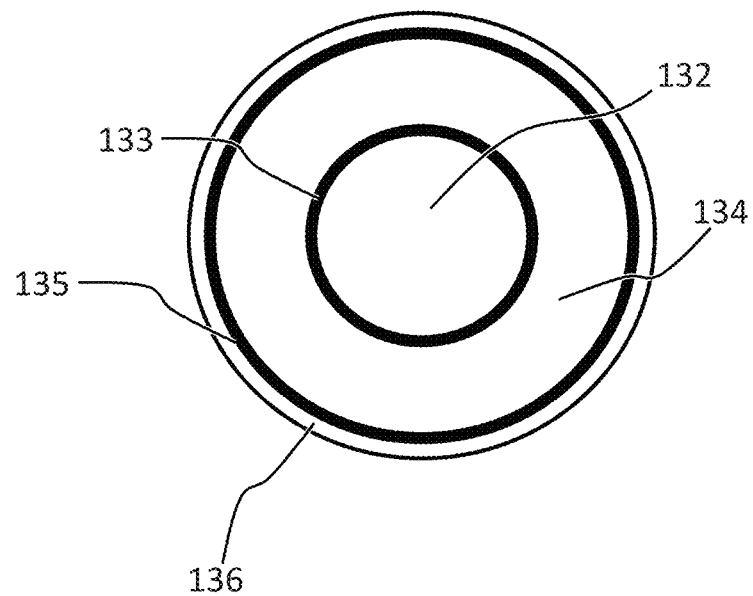
FIG. 3A and FIG. 3B depict examples of heat-generating microcapsules.

FIG. 3A depicts a particular example of an internal structure of a microcapsule 130. The depicted microcapsule 130 may be referred to as a multi-compartment microcapsule having a shell-in-shell architecture. In the microcapsule 130 of FIG. 3A, compartments for first component 132 and second component 134 are provided by an inner barrier 133 (also referred to as inner shell 133) contained within an outer shell 135. The depiction in FIG. 3A is cross-sectional and the microcapsule 130 may be a spheroid or ovoid. The inner barrier 133 may be designed to rupture under a particular compressive force as a triggering stimulus. The outer shell 135 may be designed to rupture under the same force as the inner barrier 133 or a different force. A coating 136 can be provided on the outer shell 135. The coating 136 is optional and can be included, for example, to promote adhesion and/or miscibility between microcapsule 130 and a matrix material (such as shape memory material 110 or coating material 210). Additional compartments/shells may be provided, such that, for example, a plurality of inner barriers (shells) 133 may be provided in a nested arrangement with additional components included within the additional compartments thus formed.

Figure 3B:
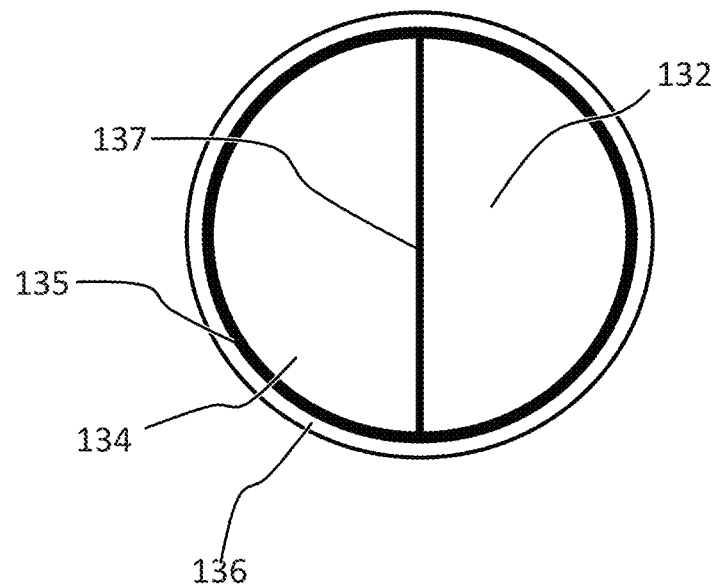

FIG. 3B depicts another particular example of an internal structure of a microcapsule 130. The depicted microcapsule 130 may be referred to as a multi-compartment microcapsule. In the microcapsule 130 of FIG. 3B the compartments for first component 132 and second component 134 are formed by an inner barrier 137 (also referred to as an inner membrane 137) contained within outer shell 135. The depiction in FIG. 3B is cross-sectional and the microcapsule 130 may be spheroid or ovoid. The inner barrier 137 may be designed to rupture under a particular compressive force. The outer shell 135 may be designed to rupture under the same force as the inner barrier 137 or a different force. As depicted in FIG. 3A, a coating 136 can be provided on the outer shell 135.

There is no requirement that only one type of microcapsule 130 be incorporated into the shape memory article or material. For example, any combination of different types of microcapsules 130 described above may be incorporated and a variety of different first/second components may be adopted in different microcapsules.

Fabrication of Microcapsules

Microcapsules 130 may be prepared according to methods disclosed in commonly assigned, U.S. patent application Ser. No. 14/937,983, the entire contents of which is incorporated herein by reference. In one possible method, microcapsules 130 can be prepared by preparing spherical calcium carbonate microparticles in which finely powdered iron (Fe) and magnetite ($Fe_3O_4$) are immobilized by co-precipitation. Optionally a catalyst such as ferric nitrate may be included in the calcium carbonate microparticles. For example, 1M $CaCl_2$ (0.615 mL), 1M $Na_2CO_3$ (0.615 mL), 1.4% (w/v) magnetite nanoparticle suspension (50 μL) and deionized water (2.450 mL) containing finely powdered iron (2 mg) and, optionally, $Fe(NO_3)_3$ (0.01 mg) may be mixed and thoroughly agitated on a magnetic stirrer for 20 s at room temperature. After the agitation, the precipitate may be separated from the supernatant by centrifugation and washed three times with water. The diameter of the $CaCO_3$ microparticles produced by a reaction time of 20 s is 4-6 μm. Smaller $CaCO_3$ microparticles are produced if the reaction time is reduced. Other metals may be used in lieu of, or in addition to, the powdered iron. For example, magnesium or magnesium-iron alloy may also be used.

Other magnetic nanoparticles may be used in lieu of, or in addition to, the magnetite. For example, cobalt ferrite nanoparticles may also be used. As noted above, the iron powder may be mixed with a catalyst such as ferric nitrate, which when in contact with hydrogen peroxide (to be encapsulated in the outer shell in this example) liberates oxygen, which reacts exothermically with the iron powder. Other catalysts may be used in lieu of, or in addition to, the ferric nitrate. For example, sodium iodide (NaI) may also be used.

In this example, the fabrication of microcapsules is based on the layer-by-layer (LbL) self-assembly of polyelectrolyte thin films. Such polyelectrolyte capsules are fabricated by the consecutive adsorption of alternating layers of positively and negatively charged polyelectrolytes onto sacrificial colloidal templates. Calcium carbonate is but one example of a sacrificial colloidal template. One skilled in the art will appreciate that other templates may be used in lieu of, or in addition to, calcium carbonate. For example, polyelectrolyte capsules may be templated on melamine formaldehyde and silica. In the present example, the $CaCO_3$ microparticles are LbL coated to form a polyelectrolyte multilayer (PEM) build-up by adsorbing five bilayers of negative PSS (poly (sodium 4-styrenesulfonate); Mw=70 kDa) and positive PAH (poly(allylamine hydrochloride); Mw=70 kDa) (2 mg/mL in 0.5 M NaCl) by using the layer-by-layer assembly protocol. The $CaCO_3$ microparticles may be dispersed in a 0.5 M NaCl solution with 2 mg/mL PSS (i.e., polyanion) and shaken continuously for 10 min. The excess polyanion may be removed by centrifugation and washing with deionized water. Then, 1 mL of 0.5 M NaCl solution containing 2 mg/mL PAH (i.e., polycation) may be added and shaken continuously for 10 min. The excess polycation may be removed by centrifugation and washing with deionized water. This deposition process of oppositely charged polyelectrolytes may be repeated five times and, consequently, five PSS/PAH bilayers are deposited on the surface of the $CaCO_3$ microparticles. The thickness of this "inner barrier" polyelectrolyte multilayer may be varied by changing the number of bilayers. Other polyelectrolyte multilayers and other coatings may be used in lieu of, or in addition to, the PSS/PAH-multilayer. For example, coating polyelectrolyte multilayer capsules with lipids can result in a significant reduction of the capsule wall permeability.

To prepare ball-in-ball calcium carbonate microparticles in which a second material such as hydrogen peroxide is immobilized in a second compartment, a polyelectrolyte multilayer that is sandwiched between two calcium carbonate compartments is formed by another co-precipitation process. To this end, the polymer-coated $CaCO_3$ microparticles may be re-suspended in 1M $CaCl_2$ (0.615 mL), 1M $Na_2CO_3$ (0.615 mL), and deionized water (2.500 mL) containing hydrogen peroxide (1 mg), rapidly mixed and thoroughly agitated on a magnetic stirrer for 20 s at room temperature. After the agitation, the precipitate may be separated from the supernatant by centrifugation and washed three times with water. The second co-precipitation may be accompanied by formation of a coproduct, i.e., single core $CaCO_3$ microparticles that contain only hydrogen peroxide. Hence, the resulting precipitate represents a mixture of ball-in-ball $CaCO_3$ microparticles and single core $CaCO_3$ microparticles. The ball-in-ball $CaCO_3$ microparticles are, however, magnetic due to the immobilized magnetite nanoparticles in the inner compartment, and thus may be isolated by applying an external magnetic field to the sample while nonmagnetic single core $CaCO_3$ microparticles are removed by a few washing steps.

Another LbL coating is formed on the ball-in-ball $CaCO_3$ microparticles by a polyelectrolyte multilayer (PEM) build-up with five bilayers of negative PSS (poly(sodium 4-styrenesulfonate); Mw=70 kDa) and positive PAH (poly(allylamine hydrochloride); Mw=70 kDa) (2 mg/mL in 0.5 M NaCl) by using the layer-by-layer assembly protocol. For example, the ball-in-ball $CaCO_3$ microparticles may be dispersed in a 0.5 M NaCl solution with 2 mg/mL PSS (i.e., polyanion) and shaken continuously for 10 min. The excess polyanion may be removed by centrifugation and washing with deionized water. Then, 1 mL of 0.5 M NaCl solution containing 2 mg/mL PAH (i.e., polycation) may be added and shaken continuously for 10 min. The excess polycation may be removed by centrifugation and washing with deionized water. This deposition process of oppositely charged polyelectrolyte may be repeated five times and, consequently, five PSS/PAH bilayers are deposited on the surface of the ball-in-ball $CaCO_3$ microparticles.

The $CaCO_3$ core of the ball-in-ball $CaCO_3$ microparticles may be removed by complexation with ethylenediaminetetraacetic acid (EDTA) (0.2 M, pH 7.5) leading to formation of shell-in-shell microcapsules. For example, the ball-in-ball $CaCO_3$ microparticles may be dispersed in 10 mL of the EDTA solution (0.2 M, pH 7.5) and shaken for 4 h, followed by centrifugation and re-dispersion in fresh EDTA solution. This core-removing process may be repeated several times if necessary to completely remove the $CaCO_3$ core. The diameter of the resulting shell-in-shell microcapsules ranges from 8-10 µm with an inner core diameter of 3-5 µm.

A multi-compartment microcapsule for heat generation in accordance with some embodiments of the present disclosure may be produced by other conventional multi-compartment capsule fabrication processes, such use of polymeric micelles, hybrid polymer microspheres, and two-compartment vesicles.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A shape memory article, comprising:
a shape memory material that transitions to a first shape from a second shape when a temperature of the shape memory material exceeds a threshold temperature; and
a plurality of microcapsules in thermal contact with the shape memory material, wherein
each microcapsule in the plurality of microcapsules has a first compartment, a second compartment, and an isolating structure separating the first and second compartments, wherein the isolating structure is rupturable in response to a stimulus, the first compartments each contain a first component, and the second compartments each contain a second component that reacts with the first component to produce heat.

2. The shape memory article of claim 1, wherein the plurality of microcapsules is in the shape memory material.

3. The shape memory article of claim 1, wherein the shape memory material is polymeric.

4. The shape memory article of claim 1, further comprising:
a coating on the shape memory material, wherein the plurality of microcapsules is in the coating formed on the shape memory material.

5. The shape memory article of claim 1, wherein the shape memory material is a metal alloy.

6. The shape memory article of claim 1, wherein the first component is a metal and the second component is an oxidizer.

7. The shape memory article of claim 1, wherein the microcapsule is a shell-in-shell microcapsule and the isolating structure is an inner shell surrounding the first compartment.

8. A shape memory article, comprising:
a matrix material that transitions to a first shape from a second shape when a temperature of the matrix material exceeds a threshold temperature; and
a microcapsule in the matrix material, wherein
the microcapsule has a first compartment, a second compartment, and an isolating structure separating the first and second compartments, wherein the isolating structure is rupturable in response to a stimulus, the first compartment contains a first component, and the second compartment contains a second component that reacts with the first component to produce heat.

9. The shape memory article of claim 8, wherein the microcapsule is a shell-in-shell microcapsule and the isolating structure is an inner shell surrounding the first compartment.

10. The shape memory article of claim 8, wherein the first component is a metal and the second component is an oxidizer.

11. The shape memory article of claim 8, wherein a third component that catalyzes a reaction between the first and second components is included in the microcapsule.

12. The shape memory article of claim 8, wherein the first component comprises iron and the second component comprises hydrogen peroxide.

13. The shape memory article of claim 8, wherein the matrix material is polymeric.

14. A shape memory article, comprising:
a shape memory material that transitions to a first shape from a second shape when a temperature of the shape memory material exceeds a threshold temperature;
a coating on at least a portion of the shape memory material; and
a microcapsule in the coating, wherein
the microcapsule has a first compartment, a second compartment, and an isolating structure separating the first and second compartments, wherein the isolating structure is rupturable in response to a stimulus, the first compartment contains a first component, and the second compartment contains a second component that reacts with the first component to produce heat.

15. The shape memory article of claim 14, wherein the shape memory material is a metal alloy.

16. The shape memory article of claim 14, wherein the shape memory material is polymeric.

17. The shape memory article of claim 14, wherein the shape memory material is gasket-shaped.

18. The shape memory article of claim 14, wherein the microcapsule is a shell-in-shell microcapsule and the isolating structure is an inner shell surrounding the first compartment.

19. The shape memory article of claim 14, wherein the first component is a metal and the second component is an oxidizer.

20. The shape memory article of claim 14, wherein the first component comprises iron and the second component comprises hydrogen peroxide.

* * * * *